(12) United States Patent
Pfeiffer et al.

(10) Patent No.: US 8,499,649 B2
(45) Date of Patent: Aug. 6, 2013

(54) TESTING A TORQUE TOOL

(75) Inventors: Michael William Pfeiffer, Savage, MN (US); Brendan Joseph Moore, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 486 days.

(21) Appl. No.: 12/783,154

(22) Filed: May 19, 2010

(65) Prior Publication Data

US 2011/0283813 A1    Nov. 24, 2011

(51) Int. Cl.
*B25B 23/14* (2006.01)
(52) U.S. Cl.
USPC ...................................... 73/862.21
(58) Field of Classification Search
USPC .......................... 73/862.21–862.23
See application file for complete search history.

(56) References Cited

U.S. PATENT DOCUMENTS

| | | | |
|---|---|---|---|
| 3,974,884 A | 8/1976 | Gidlund | |
| 5,954,446 A * | 9/1999 | Ireland | 403/11 |
| 6,473,959 B1 * | 11/2002 | Macpherson et al. | 29/602.1 |
| 6,609,407 B1 | 8/2003 | Tambini | |
| 6,847,181 B2 * | 1/2005 | Brooks et al. | 318/568.11 |
| 6,941,724 B2 | 9/2005 | Arrant et al. | |
| 7,172,223 B2 * | 2/2007 | Storvick et al. | 292/251.5 |
| 2007/0199780 A1 | 8/2007 | Felber et al. | |
| 2007/0261868 A1 | 11/2007 | Gross | |

* cited by examiner

*Primary Examiner* — Lisa Caputo
*Assistant Examiner* — Octavia D. Hollington
(74) *Attorney, Agent, or Firm* — Mitchell K. McCarthy

(57) ABSTRACT

An apparatus and associated method for gaging the repeatability of a tool is provided by a pivot assembly. The pivot assembly has a pivot member with a tool engagement feature to selectively receive a torque from the tool at a pivot axis. The pivot assembly also has a first magnetically permeable member fixed in movement with the pivot member. The pivot assembly further has a second magnetically permeable member. An abutment member abuttingly engages the pivot member to limit its pivotal travel at a position where the first and second magnetically permeable members are magnetically coupled together, without contacting each other for being separated by a gap, by a magnetic force of attraction urging the pivot member toward the second magnetically permeable member.

20 Claims, 5 Drawing Sheets

TESTING A TORQUE TOOL

SUMMARY

In some embodiments a tool gage is provided having a pivot assembly. The pivot assembly has a pivot member with a tool engagement feature to selectively receive a torque from the tool at a pivot axis. The pivot assembly also has a first magnetically permeable member fixed in movement with the pivot member. The pivot assembly further has a second magnetically permeable member. An abutment member abuttingly engages the pivot member to limit its pivotal travel at a position where the first and second magnetically permeable members are magnetically coupled together, without contacting each other for being separated by a gap, by a magnetic force of attraction urging the pivot member toward the second magnetically permeable member.

In some embodiments a method is provided for testing a tool, including steps of obtaining a gage comprising a pivot assembly having a pivot member, a first magnetically permeable member fixed in movement with the pivot member, a second magnetically permeable member, and an abutment member operably limiting a pivotal travel of the pivot member. The method further includes adjustably positioning at least one of the first magnetically permeable member and the second magnetically permeable member to select a size of a gap between them when the pivotal travel of the pivot member is limited by the abutment member, thereby magnetically coupling the first and second magnetically permeable members together with a force of attraction without contactingly engaging each other for being separated by the gap. The method further includes using the tool to impart a torque to a pivot axis of the pivot member. The method further includes comparing a tool output value obtained during the using step to an expected value associated with the force of attraction.

In some embodiments a tool gage is provided having a base supporting a pivot member, and means for magnetically coupling the pivot member by a force that simulates breakaway torque of a threaded fastener.

DESCRIPTION

Threaded fasteners are widely used in the construction of consumer goods because they are so reliable and inexpensive. The veracity of a threaded joint, however, relies entirely on the frictional engagement of the threadingly engaged members. For that reason, manufacturers typically specify torque values for threaded fasteners, especially threaded fasteners associated with key quality characteristics, to ensure the expected levels of safety and reliability are realized.

A variety of torque indicating tools, or "torque tools," are used to measure the torque that is applied to a threaded fastener. Particularly, a torque tool is employed to measure the forward and/or reverse breakaway torque of a threaded joint in order to characterize its fastening capability. Some torque tools operate in response to a deflection and provide an output value in the form of a graduated scale and pointer. More sensitive and precise torque tools used in manufacturing production systems generally use a torque transducer with a digital output coupled to a rotary motor.

Any torque tool must be calibrated from time to time to ensure that it is providing an accurate indication of the measured breakaway torque. As with any metrology system, a tool gage is necessary to measure the repeatability with which the torque tool operates. A threaded joint itself is not well suited for use as a tool gage because the frictional engagement between the threaded members changes as they are repeatedly torqued together. Improvements are needed in repeatedly and predictably simulating the breakaway torque with which threaded fasteners are engaged, without using threaded members themselves, for the purpose of providing a tool gage for testing the repeatability of a torque tool.

Figure 1:
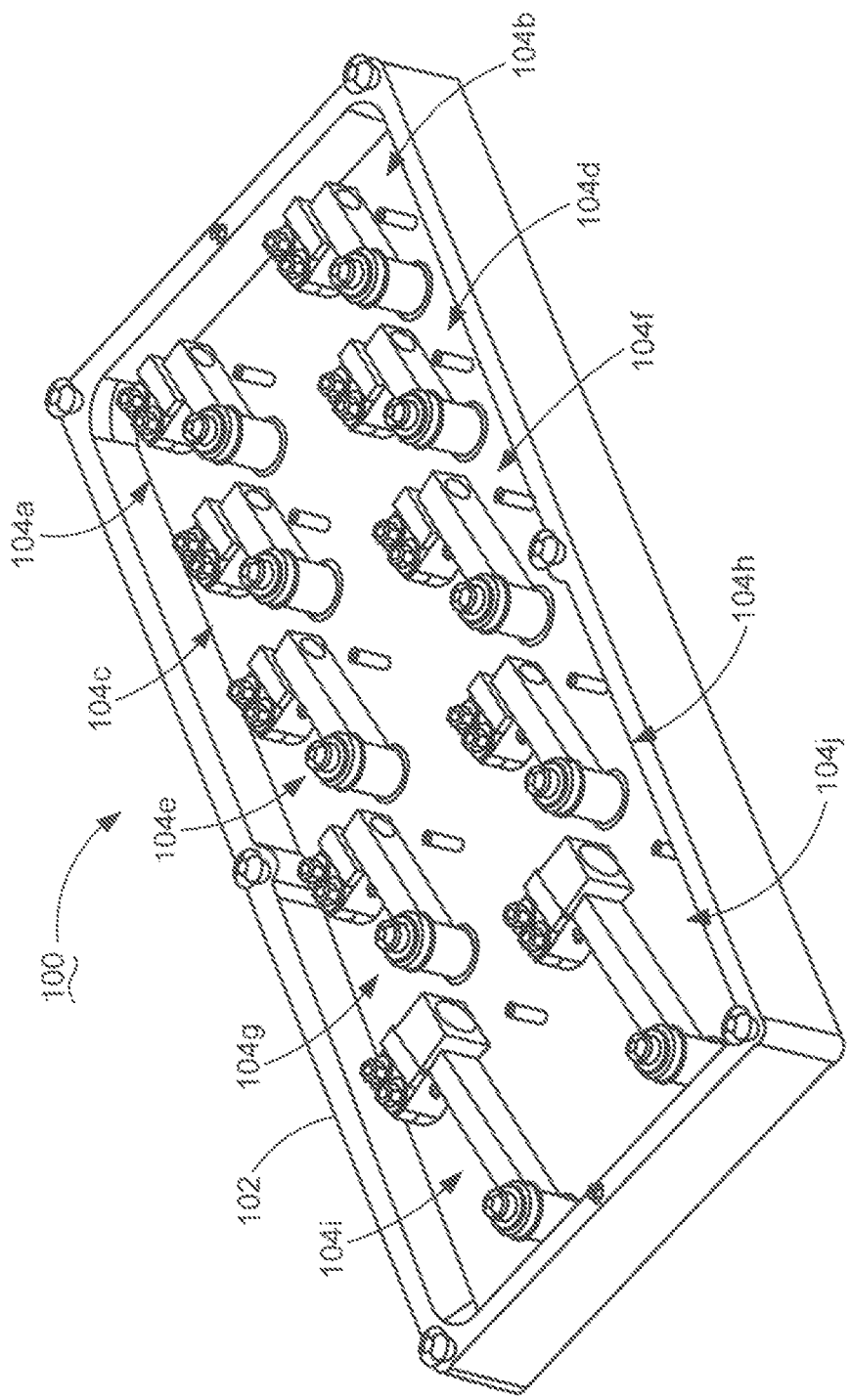
FIG. 1 is an isometric depiction of a tool gage that is constructed in accordance with embodiments of the present invention.

Turning now to the FIGS. collectively and first particularly to FIG. 1 which is an isometric depiction of a tool gage 100 that is constructed in accordance with embodiments of the present invention. The tool gage 100 in these illustrative embodiments has a base 102 supporting each of ten individually operable pivot assemblies 104 (denoted a-j). Each of the pivot assemblies 104 is constructed and operated similarly, so the following description of one of the pivot assemblies 104 is generally applicable to them all.

Figure 2:
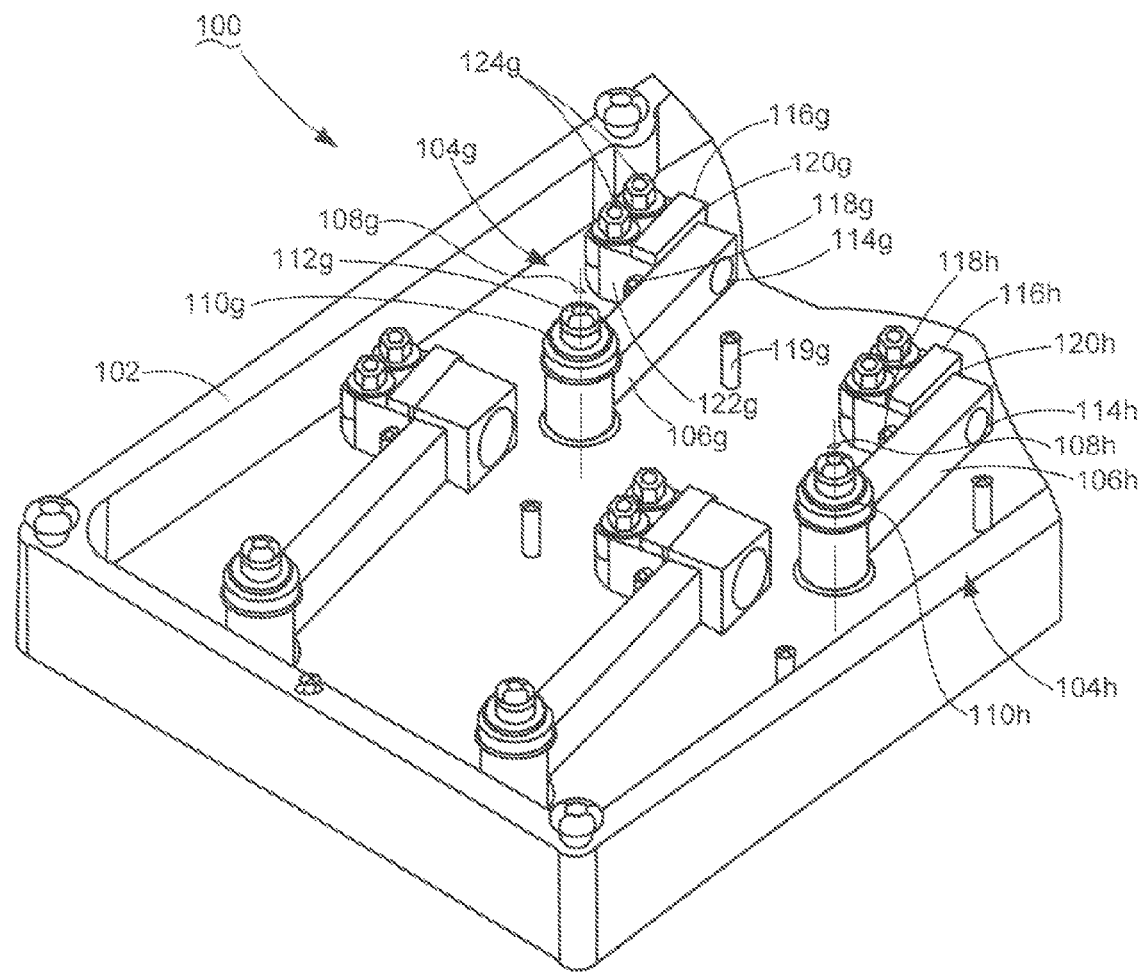
FIG. 2 is an enlarged view of a portion of FIG. 1.

FIG. 2 is an enlarged detail view of a portion of the tool gage 100 of FIG. 1 more clearly depicting the pivot assembly 104g. The pivot assembly 104g includes a pivot member 106g that is journalled for rotation relative to the base 102 around a pivot axis 108g by a cartridge bearing 110g. A tool engagement feature 112g is matingly engageable by a torque tool bit (FIG. 4) and affixed to the pivot member 106g to selectively receive a torque from the torque tool at the pivot axis 108g.

A first magnetically permeable member 114g is fixed in movement with the first pivot member 106g, and a second magnetically permeable member 116g is supported by the base 102. Generally, the first and second magnetically permeable members function to magnetically couple together with a force of attraction simulating the breakaway torque of a threaded fastener.

The particular constructions of the first and second magnetically permeable members will depend on the magnitude of the desired force of attraction. For purposes of describing these illustrative embodiments the first magnetically permeable member 114g is depicted as being a magnet and the second magnetically permeable member 116g is depicted as being a steel plate. In equivalent alternative embodiments they can be reversed; that is, the first magnetically permeable member 114g can be a steel member and the second magnetically permeable member 116 can be a magnet. In other alternative equivalent embodiments both the first and second magnetically permeable members 114g, 116g can be magnets with opposite facing poles. In yet other equivalent alternative embodiments one or both of the first and second magnetically permeable members can be constructed of electro-magnets, and the like.

An upstanding pin supported by the base 102 provides an abutment member 118g that abuttingly engages the pivot member 106g to limit its pivotal travel at a position where the first and second magnetically permeable members 114g, 116g are magnetically coupled together without contactingly engaging each other. A like abutment member 119g limits the extent of clockwise rotation of the pivot member 106g.

Figure 3:
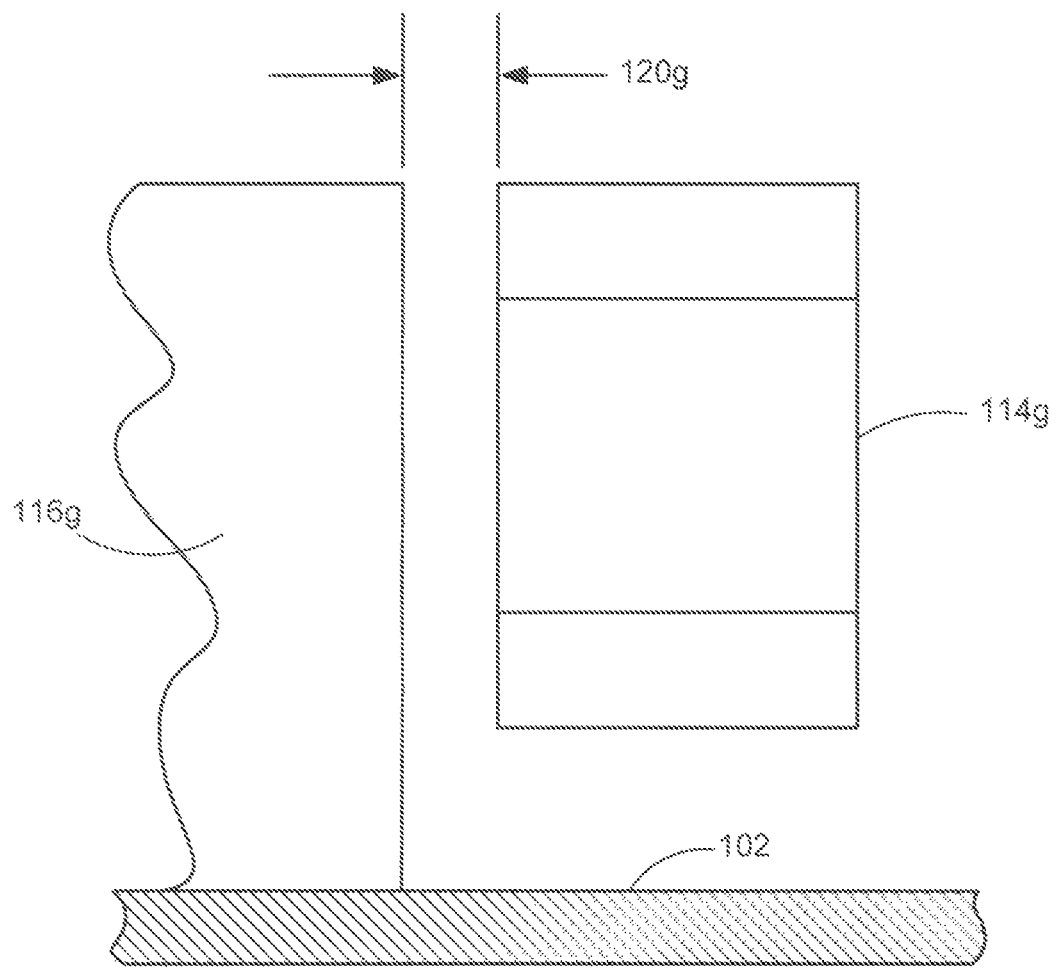
FIG. 3 is a cross-sectional depiction of the first and second magnetically permeable members coupled together across a selected size gap.

FIG. 3 is a cross-sectional view, depicting how, when the pivot member 106g (FIG. 2) abuttingly engages the abutment member 118g, the first and second magnetically permeable members are magnetically coupled together across a gap 120g by a magnetic force of attraction urging the pivot member 106g (FIG. 2) toward the second magnetically permeable member 116g.

At least one of the first magnetically permeable member 114g and the second magnetically permeable member 116g is adjustably positionable to selectively vary the size of the gap 120g. For example, in the illustrative embodiments of FIG. 2 the second permeable member 116g is attached to an upstanding support 122g. The support 122g is slotted with a fastener 124g passing through each slot to threadingly engage the base 102. With the fasteners 124g loosened, the support 122g is adjustably positionable to vary the size of the gap 120g. A selected size gap 120g can be obtained by placing a feeler gage between the first and second permeable members 114g, 116g, then tightening the fasteners 124g to operably maintain the position of the support 122g. Although not depicted, in alternative equivalent embodiments the first magnetically permeable member 114g can be adjustably positionable to vary the size of the gap 120g. In other alternative equivalent embodiments one of the first and second magnetically permeable members 114g, 116g can be adjustably positionable in the longitudinal direction of the pivot arm 106g in order to selectively vary the effective moment arm between the pivot axis 108g and the force of magnetic attraction by the magnetically coupled first and second magnetic permeable members 114g, 116g.

Having described the construction of one of the pivot assemblies 104, the focus now returns to the plurality of pivot assemblies 104 depicted in FIG. 1. It will be noted that in these illustrative embodiments the pivot assemblies 104 are in three groups defined by different-length pivot arms 106. That is, the pivot assemblies 104a, 104b, 104c, 104d each have the shortest-length pivot arm 106. Pivot assemblies 104e, 104f, 104g, 104h each have a medium-length pivot arm 106. Pivot assemblies 104i, 104j each have the longest-length pivot arm 106. A comparatively longer pivot arm 106 will generally require a greater breakaway torque to overcome the magnetic coupling force and thereby rotate the pivot arm 106 in a clockwise direction. The different lengths of pivot arms 106 can be useful in measuring different ranges of torque values, such as measuring inch-ounces of torque with the pivot assemblies 104a-104d, measuring inch-pounds of torque with the pivot assemblies 104e-104h, and measuring foot-pounds of torque with the pivot assemblies 104i, 104j.

The gaps 120 can advantageously be set differently among pivot assemblies 104 in the same group to test the repeatability of the same tool at different torque values. For example, referring to FIG. 2, pivot assembly 104h is constructed like pivot assembly 104g described above. That is, for example, the pivot assembly 104h includes a pivot member 106h that is journalled for rotation relative to the base 102 around a pivot axis 108h by a cartridge bearing 110h. A first magnetically permeable member 114h is fixed in movement with the first pivot member 106h, and a second magnetically permeable member 116h is supported by the base 102. An upstanding pin supported by the base provides an abutment member 118h that abuttingly engages the pivot member 106h to limit its pivotal travel at a position where the first and second magnetically permeable members 114h, 116h are magnetically coupled together without contactingly engaging each other for being spatially separated by a gap 120h.

In the manner described above, the pivot assembly 104g can be set to have a first gap 120g and the pivot assembly 104h can be set to have a larger second gap 120h. The magnetic force of attraction is inversely related to the selected size of the gap 120. The magnetic force of attraction can be calculated for a given gap 120 size and known properties of the magnetically permeable members.

Figure 4:
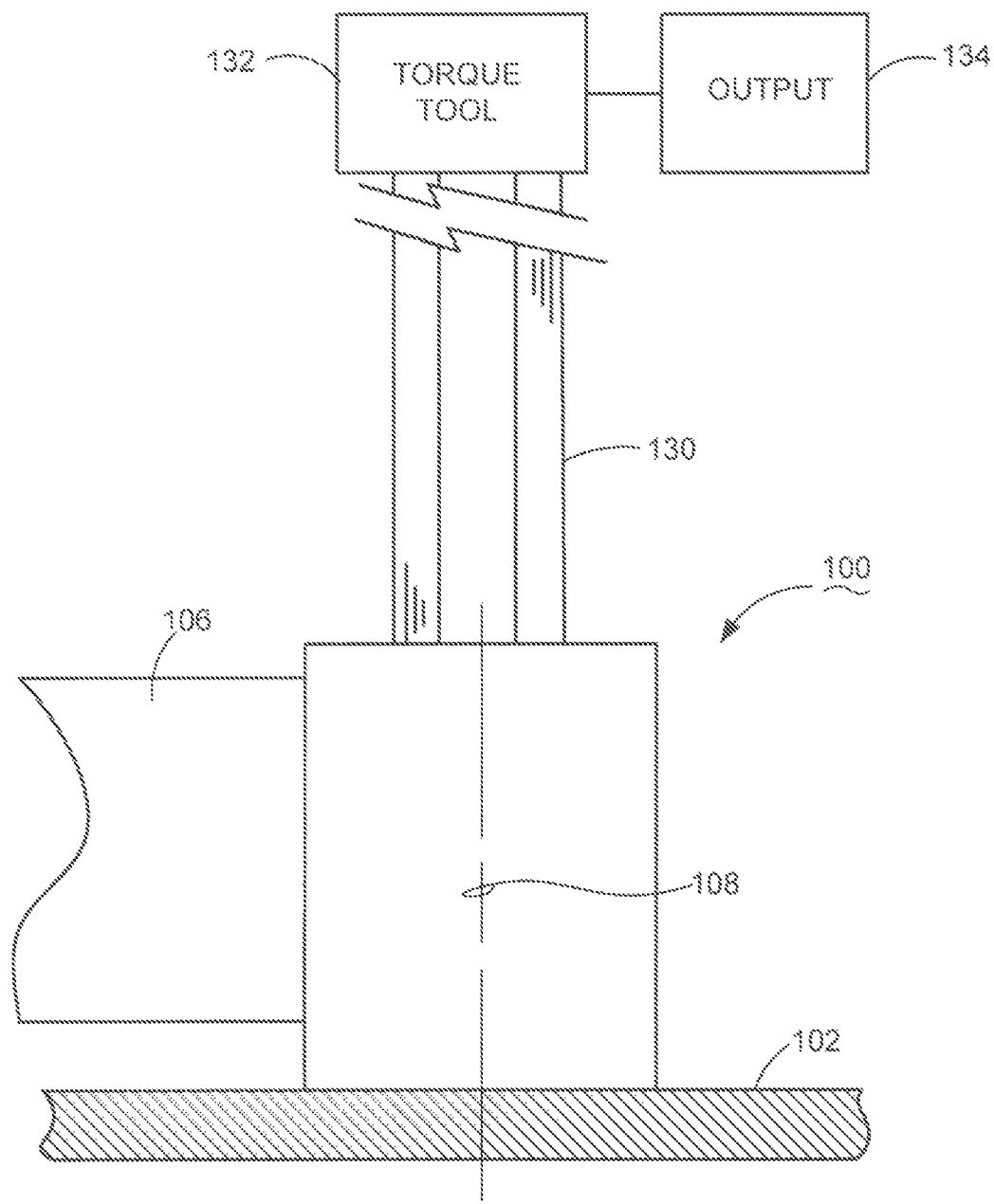
FIG. 4 diagrammatically depicts a torque tool being tested by the tool gage of FIG. 1.

FIG. 4 depicts how the driver bit 130 of a torque tool 132 connects to the engagement feature 112 to impart a torque around the pivot axis 108. The magnitude of the torque is displayed or otherwise obtainable as an output value 134 from the torque tool 132. The torque imparted by the torque tool 132 is opposed by the magnetic coupling of the magnetically permeable members 114, 116 urging against pivot arm 106 rotation. The tool gage 100 simulates the breakaway torque when the pivot arm 106 rotates away (in a clockwise direction in FIG. 1) from the coupling force of attraction with the second magnetically permeable member 116. The output value 134 when breakaway torque is reached can be compared to the calculated (expected) value to calibrate the accuracy of the torque tool 132. The test can be repeated to calculate the repeatability, or precision, of the torque tool 132.

Even if the expected value of breakaway torque is not calculated, any one or more given size gap(s) can be used to empirically test the torque tool 132 repeatability. Using two or more pivot assemblies 104 with different-size gaps 120 advantageously permits testing for variance in repeatability at different test points. Using two or more pivot assemblies 104 with different-length pivot arms 120 advantageously broadens the range of measurement across which the variance in repeatability can be tested.

Figure 5:
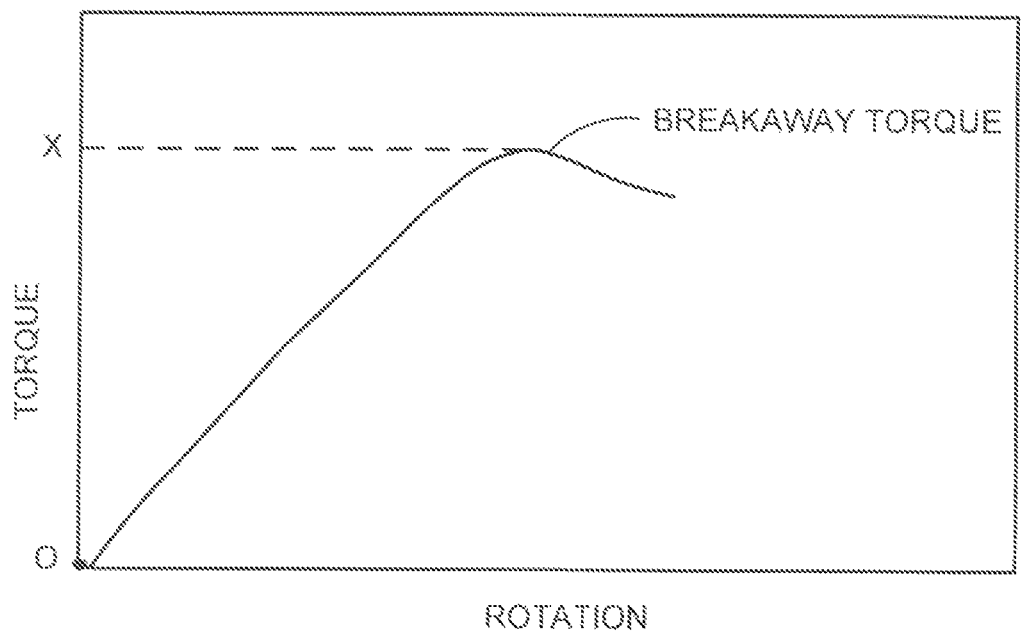
FIG. 5 graphically depicts test data obtained during experimentation with the tool gage of FIG. 1.

FIG. 5 depicts test data obtained during experimenting with a tool gage in accordance with embodiments of the present invention. The output value 134 and rotation (such as in degrees) of the torque tool 132 are related as depicted in the elastic windup between the bit 130 and tool gage 100. The peak torque value, the breakaway torque, is identified when the pivot arm 106 moves away, simulating the torque necessary to slip the frictional engagement of a threaded fastener.

Generally, the present embodiments encompass a tool gage having a base supporting a pivot member, and means for magnetically coupling the pivot member by a force that simulates breakaway torque of a threaded fastener. For purposes of this description "means for magnetically coupling" encompasses the structure described herein and structural equivalents thereof involving the non-contacting coupled engagement of the pivot arm that does not have to overcome contacting friction or stiction in simulating the breakaway torque, and that is capable of selectively adjusting the size of the gap between the coupled members. For example, without limitation, "means for magnetically coupling" expressly does not include previously attempted solutions that rely on coupled members that are contactingly engaged before the breakaway torque is reached.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts and values for the described variables, within the principles of the present embodiments to the full extent indicated by the broad general meaning of the terms.

What is claimed:

1. A tool gage, comprising:
   a pivot assembly including:
   a pivot member having a tool engagement feature to selectively receive a torque from the tool at a pivot axis;
   a first magnetically permeable member fixed in movement with the pivot member; and
   a second magnetically permeable member; and
   an abutment member that abuttingly engages the pivot member to limit to its pivotal travel at a position where the first and second magnetically permeable members are magnetically coupled together, without contacting each other for being separated by a gap, by a magnetic force of attraction urging the pivot member toward the second magnetically permeable member.

2. The tool gage of claim 1 wherein at least one of the first magnetically permeable member and the second magnetically permeable member is adjustably positionable to selectively vary a size of the gap.

3. The tool gage of claim 2 wherein the second magnetically permeable member is attached to an upstanding support defining a slot through which a fastener passes to adjustably position the second magnetically permeable member.

4. The tool gage of claim 3 wherein the fastener threadingly engages a base upon which the support is slidingly engageable in a first fastener engagement mode and is affixed thereto in a second fastener engagement mode.

5. The tool gage of claim 1 wherein at least one of the first magnetically permeable member and the second magnetically permeable member is longitudinally positionable in relation to the pivot member.

6. The tool gage of claim 1 wherein the pivot assembly is a first pivot assembly, the pivot member is a first pivot member, the pivot axis is a first pivot axis, and the gap is a first gap, the tool gage further comprising:
   a second pivot assembly including:
   a second pivot member having another tool engagement feature to selectively receive a torque from the tool at a second pivot axis;
   a third magnetically permeable member fixed in movement with the second pivot member; and
   a fourth magnetically permeable member; and
   a second abutment member that abuttingly engages the second pivot member to limit its pivotal travel at a position where the third and fourth magnetically permeable members are magnetically coupled together, without contacting each other for being separated by a second gap, by a magnetic force of attraction urging the second pivot member toward the fourth magnetically permeable member.

7. The tool gage of claim 6 wherein at least one of the third magnetically permeable member and the fourth magnetically permeable member is adjustably positionable to selectively vary a size of the second gap.

8. The tool gage of claim 7 wherein the first pivot assembly defines a first selected size gap and the second pivot assembly defines a second selected size gap that is different than the first selected size gap.

9. The tool gage of claim 6 wherein at least one of the third magnetically permeable member and the fourth magnetically permeable member is longitudinally positionable in relation to the second pivot member.

10. The tool gage of claim 6 wherein a longitudinal distance between the first pivot axis and the first magnetically permeable member defines a first moment arm and another longitudinal distance between the second pivot axis and the third magnetically permeable member defines a second moment arm that is different than the first moment arm.

11. A method for testing a tool, comprising:
    obtaining a gage comprising a pivot assembly having a pivot member, a first magnetically permeable member fixed in movement with the pivot member, a second magnetically permeable member, and an abutment member operably limiting a pivotal travel of the pivot member;
    adjustably positioning at least one of the first magnetically permeable member and the second magnetically permeable member to select a size of a gap between them when the pivotal travel of the pivot member is limited by the abutment member, thereby magnetically coupling the first and second magnetically permeable members together with a force of attraction without contactingly engaging each other for being separated by the gap;
    using the tool to impart a torque to a pivot axis of the pivot member; and
    comparing a tool output value obtained during the using step to an expected value associated with the force of attraction.

12. The method of claim 11 wherein the adjustably positioning step is characterized by moving at least one of the first magnetically permeable member and the second magnetically permeable member to selectively vary the size of the gap.

13. The method of claim 12 wherein the adjustably positioning step is characterized by releasing a fastener that engages an upstanding support to which the second magnetically permeable member is attached, moving the upstanding support to a position associated with a selected size of the gap, and engaging the fastener to affix the upstanding support at the position.

14. The method of claim 11 wherein the adjustably positioning step is characterized by longitudinally moving at least one of the first magnetically permeable member and the second magnetically permeable member in relation to the pivot member.

15. The method of claim 11 wherein the pivot assembly is a first pivot assembly, the pivot member is a first pivot member, the force of attraction is a first force of attraction, the gap is a first gap, the torque is a first torque, the pivot axis is a first pivot axis, and the tool output value is a first tool output value, and wherein the obtaining step is characterized by the gage having a second pivot assembly with a second pivot member, a third magnetically permeable member fixed in movement with the second pivot member, a fourth magnetically permeable member, and a second abutment member operably limiting a pivotal travel of the second pivot member; the method further including:
    adjustably positioning at least one of the third magnetically permeable member and the fourth magnetically permeable member to select a size of a second gap between them when the pivotal travel of the second pivot member is limited by the second abutment member, thereby magnetically coupling the third and fourth magnetically permeable members together with a second force of attraction without contactingly engaging each other for being separated by the second gap;
    using the tool to impart a second torque to a second pivot axis of the second pivot member; and
    comparing a second tool output value obtained during the using step to an expected value associated with the second force of attraction.

16. The method of claim 15 wherein the adjustably positioning step is characterized by moving at least one of the third magnetically permeable member and the fourth magnetically permeable member to selectively vary the size of the second gap.

17. The method of claim 15 wherein the adjustably positioning step is characterized by longitudinally moving at least one of the third magnetically permeable member and the fourth magnetically permeable member in relation to the second pivot member.

18. The method of claim 15 wherein the adjustably positioning steps are characterized by the first pivot assembly defining a first selected size gap and the second pivot assembly defining a second selected size gap that is different than the first selected size gap.

19. The method of claim 15 wherein the adjustably positioning steps are characterized by a longitudinal distance between the first pivot axis and the first magnetically permeable member defining a first moment arm and another longitudinal distance between the second pivot axis and the third magnetically permeable member defining a second moment arm that is different than the first moment arm.

20. A tool gage comprising:
 a base supporting magnetically permeable pivot member and a second magnetically permeable member; and
 means for urging the magnetically permeable members toward each other into a non-contacting coupled engagement producing a force resisting separation of the magnetically permeable members that simulates breakaway torque of a threaded fastener.

\* \* \* \* \*